United States Patent [19]

Fleming et al.

[11] 4,314,092
[45] Feb. 2, 1982

[54] METHODS OF AND APPARATUS FOR REHABILITATING OUTSIDE TELEPHONE PLANT

[75] Inventors: Mills L. Fleming, Lawrenceville; Francis J. Mullin, Chamblee, both of Ga.

[73] Assignees: Bell Telephone Laboratories, Incorporated, Murray Hill, N.J.; Western Electric Company, Inc., New York, N.Y.

[21] Appl. No.: 144,818

[22] Filed: Apr. 29, 1980

[51] Int. Cl.³ .................. H02G 15/196; H02G 1/14
[52] U.S. Cl. .......................... 174/38; 156/49; 174/76; 174/84 R; 174/87
[58] Field of Search ............... 174/23 R, 37, 38, 44, 174/74 A, 76, 84 R, 87, 88 R, 92; 29/868; 156/48, 49

[56] References Cited

U.S. PATENT DOCUMENTS

| | | | |
|---|---|---|---|
| 2,906,810 | 9/1959 | D'Ascoli | 174/76 X |
| 2,967,795 | 1/1961 | Bollmeier et al. | 174/76 X |
| 3,806,630 | 4/1974 | Thompson et al. | 174/76 X |
| 3,852,516 | 12/1974 | Vander Ploog et al. | 174/76 X |
| 3,879,574 | 4/1975 | Filreis et al. | 174/76 |
| 3,896,260 | 7/1975 | Plummer | 174/76 X |
| 3,912,854 | 10/1975 | Thompson et al. | 174/76 X |
| 3,912,855 | 10/1975 | Thompson et al. | 174/76 X |
| 3,916,082 | 10/1975 | Gillemot | 174/76 X |
| 3,916,086 | 10/1975 | Gillemot et al. | 174/76 X |
| 3,920,886 | 11/1975 | Gillemot et al. | 174/76 X |
| 3,934,076 | 1/1976 | Smith | 174/76 X |
| 4,015,072 | 3/1977 | Gillemot | 174/92 |
| 4,039,742 | 8/1977 | Smith | 174/76 X |
| 4,070,543 | 1/1978 | Thompson et al. | 174/87 |

FOREIGN PATENT DOCUMENTS 581263 10/1946 United Kingdom ............ 174/84 R

Primary Examiner—Laramie E. Askin
Attorney, Agent, or Firm—E. W. Somers

[57] ABSTRACT

Cable splices of outside telephone plant are rehabilitated by a method in which a length of tubing of a kit of parts is moved over end portions of cables which are to be respliced, if necessary. The tubing is collapsed adjacent jacketed portions of the cables and a collar comprising a plurality of turns of sealing tape is formed about the jacket of each of the cables in adjacent locations. A spacer block is positioned between the collars to maintain the cables spaced apart after which a liner made of a perforated, transversely corrugated strip of plastic material is wrapped about the splice. The tubing is extended over the liner and its lower end is taped about the collars to form a closed end to prevent the escape of a waterproofing material which is flowed into the opposite open end of the tubing. A length of transversely and longitudinally scored plastic is wrapped about the tubing and cut along one of the score lines to form a cover which is secured by a plurality of clamps. The enclosed encapsulated splice is generally formed within a pedestal cabinet or adjacent a telephone pole in which case it is protected mechanically by a metallic U-shaped guard that is positioned over the cover along its length and secured to the pole.

24 Claims, 14 Drawing Figures

U.S. Patent  Feb. 2, 1982  Sheet 3 of 4  4,314,092
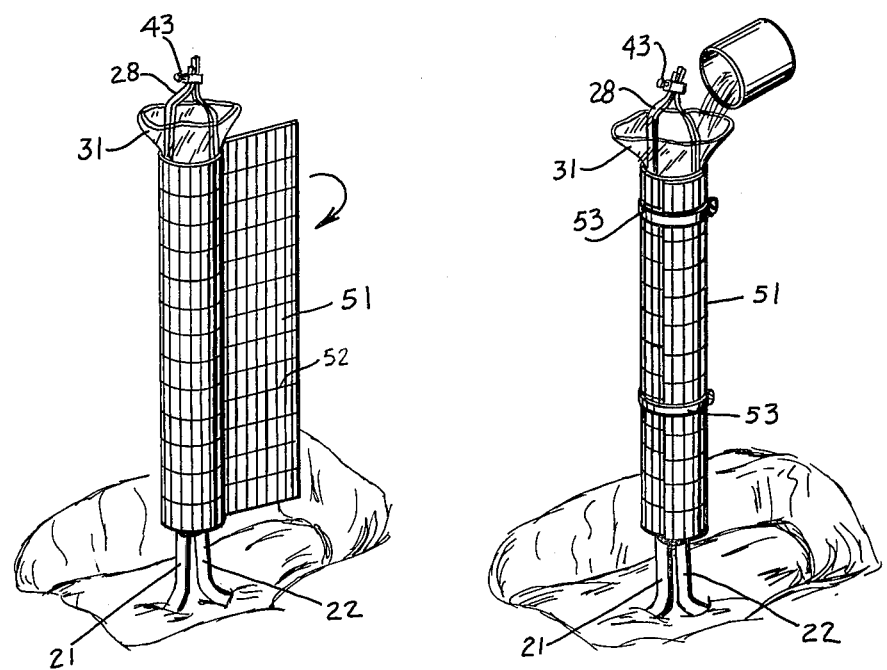
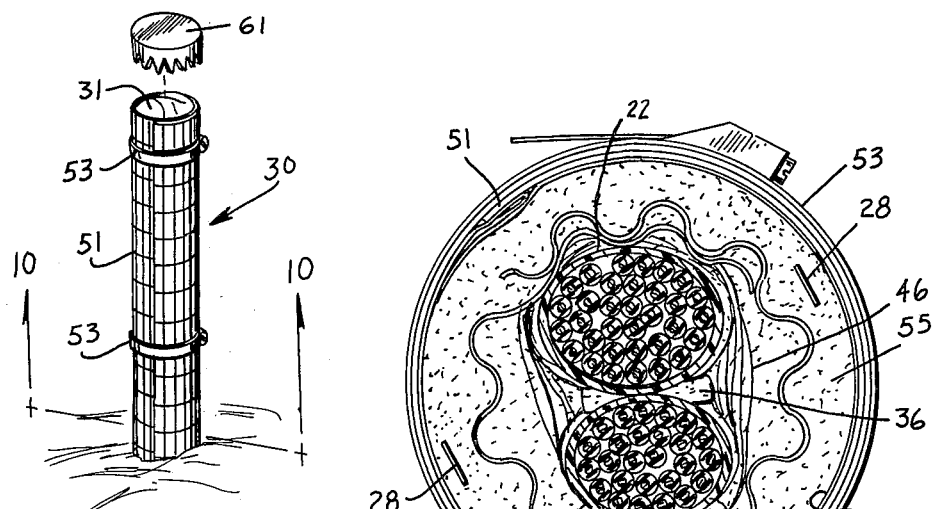

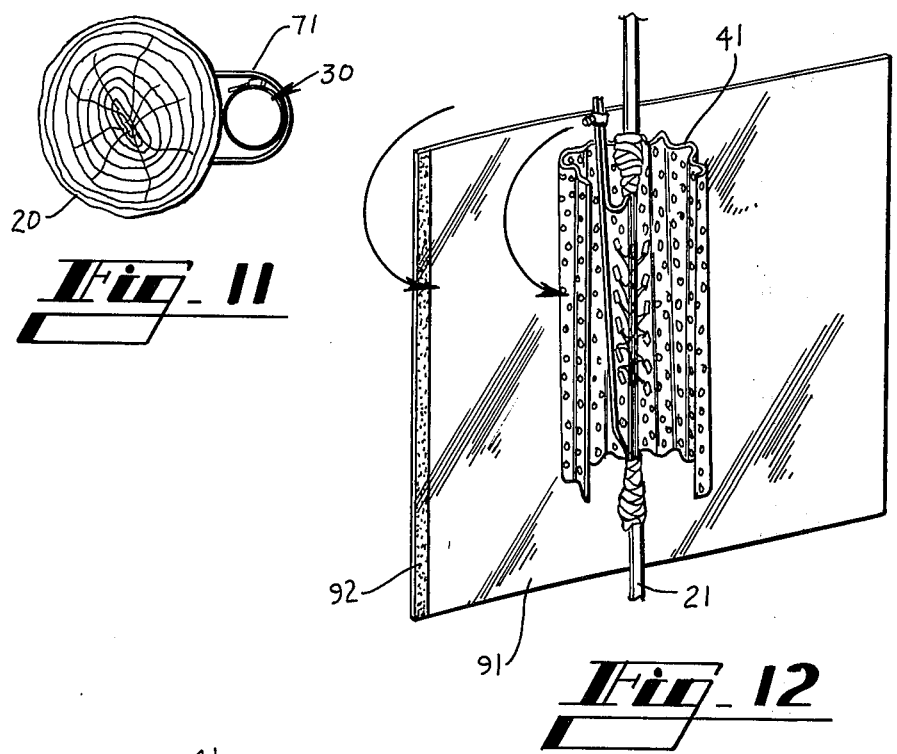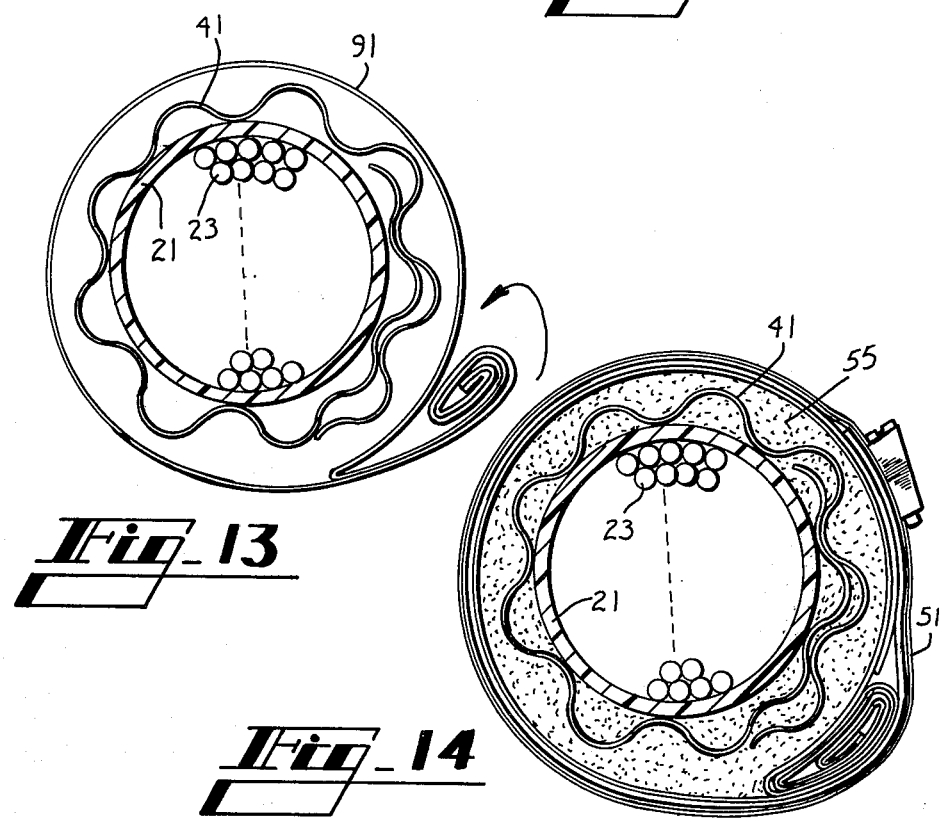

METHODS OF AND APPARATUS FOR REHABILITATING OUTSIDE TELEPHONE PLANT

TECHNICAL FIELD

This invention relates to methods of and apparatus for rehabilitating outside telephone plant, and more particularly, to apparatus which is capable of being made available as a kit of parts, said parts being used to rehabilitate cable splices and provide the capability of resisting deterioration because of exposure to the elements.

BACKGROUND OF THE INVENTION

In outside telephone plant, cable splices must be protected from the effects of the environment in which the cables are used. For example, in splicing a telephone service cable to a distribution cable in new outside telephone plant, particularly in underground installations, protection is afforded by using waterproofed cable together with closures that include provisions for preventing the ingress of moisture.

At the same time, efforts have been and will be made to upgrade existing systems and to rehabilitate deteriorated air-core buried as well as aerial distribution plant, for example, and connecting it to a stable, water-tight plant. These efforts should result in a system which is waterproof throughout, not just in newly added portions, and one which recovers capacity through pairs of conductors that may have been rendered unuseable in the past because of moisture.

Rehabilitation is particularly suited for congested or highly developed areas where costs for new underground cable runs are prohibitively high and where other options such as aerial cable distribution are not feasible, not economical or not acceptable. Such areas characteristically are constructed with single or dual sheath air core cables being spliced in ready access pedestal or pole terminals. In these, a pair of cables extend out of the ground and are spliced together within a pedestal type cabinet or a buried cable may have an exposed end which is spliced to an air core cable at a drop point from an overhead run adjacent a telephone pole. Typically, these splices are above the ground and hence exposed to all the elements.

Problems which have been encountered in these areas which result in increased operating costs are usually a combination of wet cables, faulty buried splices and insulated conductor troubles in pedestals. Symptoms of trouble are manifested in the form of relatively high defective pair counts and in the low number of spare parts which are available for example. Moisture may enter cables through construction damage, subsequent cable jacket cuts, lightning pinholes, or flooding of unplugged ends in pedestals. Conductor troubles in the pedestals themselves are caused by insect damage, cracking of insulation by heat, cracking by exposure to direct sunlight when covers have not been replaced, and repeated craftsperson handling.

Prior art methods of protecting cable splices are disclosed in U.S. Pat. Nos. 2,906,810, 3,934,076 and 4,039,742 in which the spliced cables are assembled to a plug after which the plug and the splice are inserted into a cylindrical capsule which has been prefilled with a waterproofing material to force the waterproofing material around the splice. Not only has it been found that the insertion step sometimes causes the spliced conductors to become disconnected, but the sealant in these kinds of closures tends to leak and when an assembly is inserted into a sealant-filled container, air pockets are created.

A different prior art approach is one shown in U.S. Pat. No. 3,879,574 in which a stiff, resilient, segmented plastic sheet is grooved to reduce its thickness along narrow linear intersecting latticed strips which define rectangular and triangular patterns. This permits the sheet to be cut and folded along selected narrow strips to form hollow enclosures of various sizes and shapes. The sheet section is fastened to itself or necked down at its ends about a cable and secured by tape to provide protection for a cable splice or serve as a mold to shape insulating, self-curing resinous compositions which are applied in liquid form through breakout ports about the splice. The last described arrangement has some drawbacks in that it requires excessive care in the taping of the necked down portions to avoid sealant leakage; moreover, the filling through the breakout ports may not result in a complete fill. Still other arrangements are shown in U.S. Pat. Nos. 3,806,630, 3,920,886 and 4,015,072.

What is needed and what is not provided by the art is a rehabilitation arrangement for outside plant apparatus which makes possible the upgrading of existing splices and plant to integrate them into a waterproofed communications network. Desirably, the arrangement is economical, simple to install and adaptable to a wide range of plant that may be encountered in the field.

SUMMARY OF THE INVENTION

The foregoing needs are met by a rehabilitation kit of this invention and the methods of using, said kit including tubing material for forming a plastic bag such as the well known garden and trash bag, a spacer block, means for forming a sealing collar, a liner and an outer cover and fastening means. In a method of rehabilitating a cable splice in which an end portion of each of two cables extends upwardly from the ground adjacent a telephone pole, for example, the tubing is placed over the end portions of the cables and collapsed so that the end portions protrude upwardly beyond the tubing. Collars are formed by wrapping an adhesively backed tape about the jacket of each cable, the collars being adjacent each other, and the spacer block is positioned between the cables. A sealing collar is formed about the lower end of the tubing and fastened to the tubing and spacer block by means of an adhesively backed tape which is wrapped about a lower end of the tubing to form a bag which has an upper open end.

A craftsperson splices the cables or rehabilitates the existing splice and attaches a ground clamp to the shield of each cable. Bonding conductors are attached to each bonding device and are mounted outside the cables upwardly and are connected together at a location slightly above the cables.

Then the craftsperson positions a length of a plastic liner about the splice to provide a chamber for the conductors of the cable to prevent the condensation of moisture about the splice after which the bag is pulled upwardly about the splice with its lower portion being secured to the collar. A cover which is made of an ultra-violet resistant material is positioned about the bag. Following this, the top of the bag is opened and a reenterable, water impermeable encapsulant in liquid form is flowed into the bag to encapsulate the splice.

The top portion of the bag is closed, taped, formed into a retroflexed configuration and taped about the remainder of the bag.

In order to protect the cable splice enclosure from mechanical danger, a U-shaped guard which is made of a relatively rigid material is placed about the enclosure and its free end portions attached to the telephone pole.

BRIEF DESCRIPTION OF THE DRAWINGS

Other features of the present invention will be more readily understood from the following detailed description of specific embodiments thereof when read in conjunction with the accompanying drawings, in which:

FIGS 3-8 are a sequence of perspective views showing a sequence of steps of this invention in which a kit of parts is used to rehabilitate a splice of two cables which extend upwardly from underground runs;

FIG. 9 is a perspective view of a completed enclosure made with a kit of parts of this invention;

FIG. 10 is a cross-sectional end view of the cable splice enclosure of FIG. 9 as seen in the direction of the arrows 10—10 of FIG. 9;

FIG. 11 is a plan view of a cable splice enclosure of this invention interposed between a guard and a telephone pole;

FIG. 12 is a perspective view of another embodiment of this invention in which only selected ones of cable conductors are respliced; and FIGS. 13 and 14 are end views in section of the enclosure of FIG. 12 at different stages of its assembly.

DETAILED DESCRIPTION

Methods and apparatus have been developed for rehabilitating deteriorated outside distribution plant such as, for example, cable splices to render them stable and watertight. Areas requiring rehabilitation have been characteristically constructed with single or dual sheath air core cables 21 and 22 with ready access pedestal terminals adjacent a telephone pole 20 or housed in above-ground cabinets 25—25 (see FIGS. 1 and 2).

Figure 1:
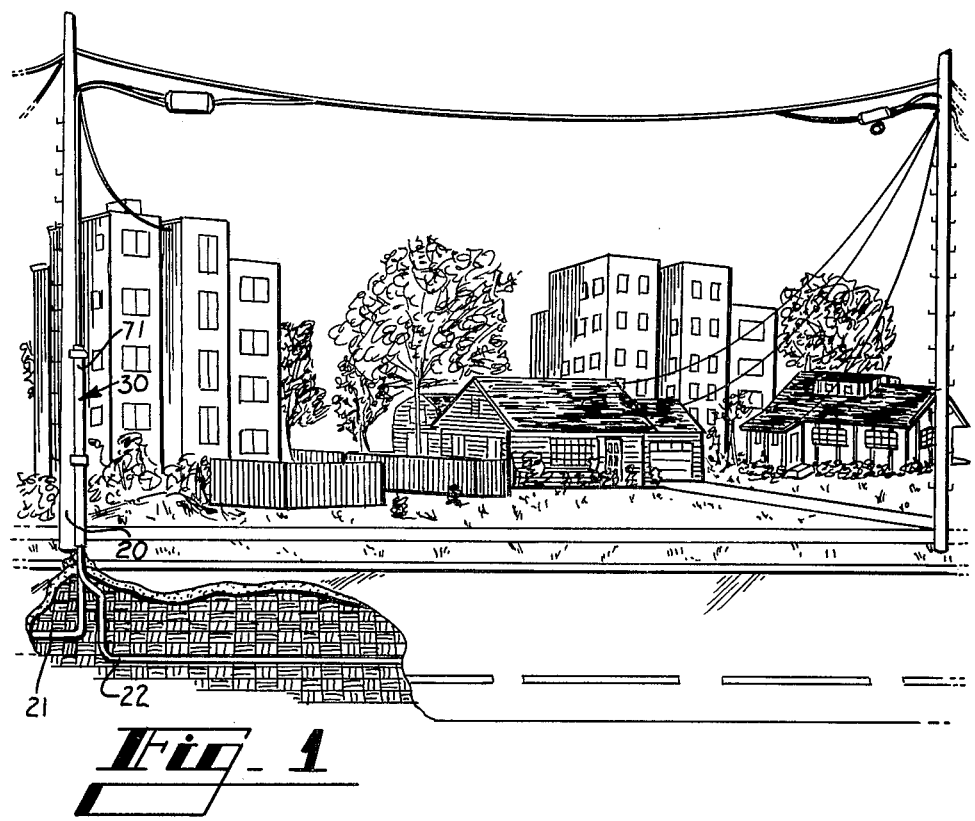
FIG. 1 shows a cable splice location in a relatively high density telephone traffic area with cables extending upwardly and downwardly from underground and aerial runs, respectively, with an enclosure of this invention being used to protect the splice.
Figure 2:
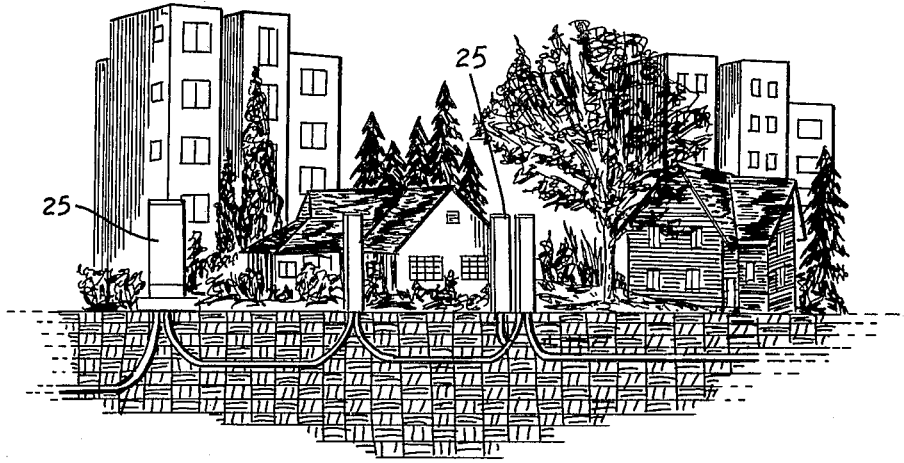
FIG. 2 shows a plurality of enclosures, each containing a cable splice which is made between end portions of cables that extend upwardly from underground runs.
Figure 3:
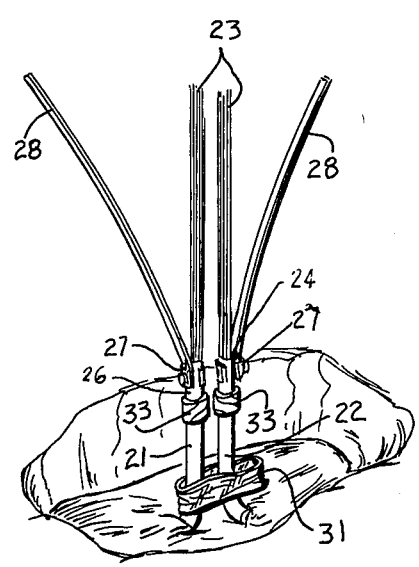

Viewing now FIGS. 1 and 3 there is shown a splice location which has been identified as one in need of rehabilitation. Extending out of the ground and into the splice location adjacent a telephone pole 20 are end portions of cables 21 and 22 each of which includes a pluraltiy of individually insulated conductors 23—23 which are enclosed in a metallic shield and at least an outer plastic jacket 26. Electrical continuity between the shields 24—24 of the two cables is provided by bond clamps 27—27 which are attached to end portions of the shields and overlying jackets with a conductive member 28, generally in the form of a stranded conductor, interconnecting the clamps.

In a first step of a method of this invention for rehabilitating the splice with an enclosure 30, a length of seamless, relatively supple tubing 31 which is made of a plastic material such as polyethylene, for example, and which has a thickness of about 0.015 cm. is moved over the exposed end portions of the cables 21 and 22 to a position which is removed from the exposed insulated conductors to allow a craftsperson to continue with the other steps of the method. Preferably the wall thickness of about 0.015 cm. is sufficient to withstand tearing under field conditions.

Then the craftsperson forms a collar 33 about each of the cables 21 and 22 with its inwardly facing surface being in engagement with the outwardly facing surface of the jacket 26 of each cable. Each of the collars 33—33 is formed by the craftsperson wrapping a plurality of turns of a sealing tape about the cable jacket 26. The sealing tape must be of a material which does not react with a waterproofing compound that is used in a subsequent step of this invention to encapsulate the splice. Such a tape may be one manufactured by the Ruvan Corporation and sold under the designation D-sealing tape.

Figure 4:
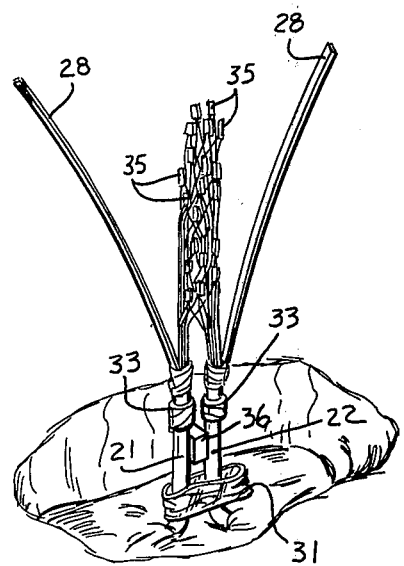

Going now to FIG. 4, it can be seen that the craftsperson has performed the splicing operation of the conductors 23—23 of one cable 21 to the conductors 23—23 of the other cable 22. This is accomplished with connectors 35—35 of the type shown for example in U.S. Pat. No. 4,118,596 which issued on Oct. 3, 1978 in the names of H. C. Bassett et al or with multiple conductor connectors of the type shown in U.S. Pat. No. 3,858,158 which issued on Dec. 31, 1974 in the names of R. W. Henn et al.

Still referring to FIG. 4, it is seen that a spacer block 36 has been inserted between the collars 33—33 on the cables 21 and 22. The spacer block is made preferably of a foamed plastic such as a polyurethane ether foam having a relatively low permeability and is used to maintain the cables 21 and 22 spaced apart to facilitate the configuring of an enclosure having a somewhat regular form. While the spacer block 36 is shown to be prismatic in shape, it could have a circular recess formed in each end thereof and be positioned horizontally so that each of the cables 21 and 22 or the collars 33—33 thereover is received in the recesses.

Then the craftsperson wraps the spliced end portions of the conductors 23—23 with a liner 41 (see FIG. 5) which comprises a length of a perforated strip 41 made from a plastic material such as for example a copolyester material marketed by Eastman Chemical Company under the designation PETG 6763. In a preferred embodiment, the strip 41 has a thickness of about 0.075 cm. and is made in a process which includes the steps of extruding, corrugating and punching and in which no lubricant is used for the tooling. The plastic material 41 is cut to length from a supply roll and has a generally corrugated configuration formed by a plurality of sinusoidal portions joined side by side to provide for easy wrapping of the material about the irregularly shaped mass of splice connections. Then the craftsperson wraps convolutions of an adhesively backed tape about the liner 41 to hold it in place.

Figure 5:
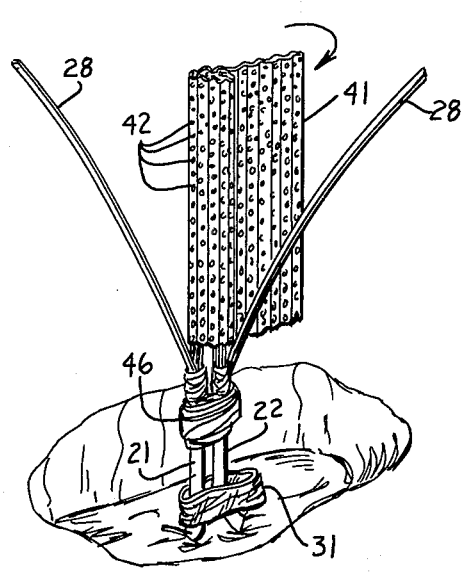

As can be seen in FIG. 5, the liner 41 is not only corrugated but is also formed with rows of openings 42—42 spaced across its width. In a preferred embodiment, about 2-3 openings each having a diameter of about 0.32 cm. are formed per square centimeter of material. The openings 42—42 allow later-introduced waterproofing compound to flow through the strip 41 to ensure the presence of the compound on each side of the liner and to form a mechanical bond therewith. Also, at least one major surface of the liner 41 is textured to form an irregular surface which enhances the mechanical bond of the waterproofing compound to the liner.

Figure 6:
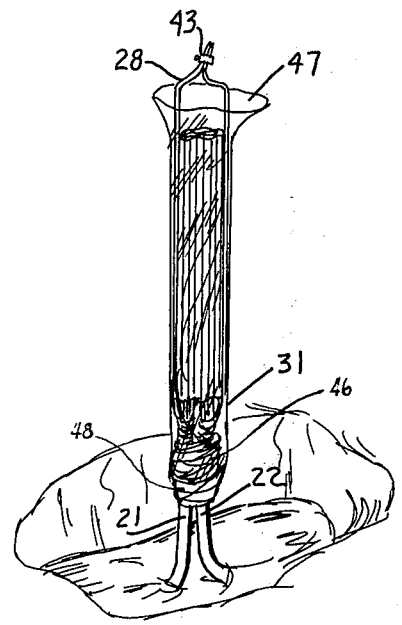

It should be observed from FIG. 5 that while the liner 41 is wrapped about the connectors, the external conductors 28—28 which are used to provide shield continuity are purposely maintained out of engagement with the strip. Subsequently, as shown in FIG. 6, the upper end portions of the external conductors 28—28 are joined together with a connector 43 (see FIG. 6) which is located above the ends of the conductors 23—23. The connector 43 may be of any of several commercially available connectors which are capable of establishing an electrical connection between two or more stranded or solid conductors.

Then the craftsperson prepares a lower end of the splice for sealing. This is accomplished with an enlarged collar 46 which encloses the collars 33—33 and which is formed by wrapping a sealing tape in a plurality of convolutions about the cables 21 and 22. The sealing tape may be the same type of material as that used to form the collars 33—33.

Again referring to FIG. 6, the next step of the method of this invention is seen to include a manipulation of the tubing 31 to pull an upper open end 47 upwardly to a portion adjacent the ground connector 43. At this time, the tubing 31 encloses the taped liner 41 and the taped spaced apart portions of the cables 21 and 22. Further, an adhesively backed tape 48 is wrapped about the lower portion of the tubing 31 which is collapsed about the ends of the collar 46 projecting above the ground. This causes the bottom of the tubing to be sealed and to effectively form a bag which encloses the liner 41 and which is capable of holding a waterproofing compound that encapsulates the splice. The liner 41 which is interposed between the cables 21 and 22 and the tubing 31 prevents the inadvertent puncture of the tubing by the splicing connectors.

FIG. 7 depicts the next step in the method in which a cover 51 that comprises a strip of a scored plastic material is wrapped about the bag 31. Various width strips of plastic material may be made available to suit different height cable stubs which extend above the ground, or a plurality of standard width strips may be overlapped to enclose a particular height bag 31. This cover 51 which forms an outer enclosure is made from a polymeric material such as polypropylene, for example which comprises about 2.5 to 2.75 percent of carbon black. It has been found that a 0.10 cm. thick material marketed by Hercules Chemical Company under the designation PROFAX 7873 is suitable for the cover 51 and resists degradation by ultra violet light. In order to provide flexibility for the cover 51 to facilitate its wrapping about the splice and to facilitate the cutting of the strip of material to length, it is formed with a grid of spaced score lines 52—52 across its width and along its length. The cover 51 which provides external protection for the splice is secured with a plurality of clamps 53—53 which are spaced along its length. The clamps 53—53 may be any of many well known commercially available clamps such as ones sold by the Ideal Corporation of Murray, Ohio or commonly used cable ties. The cover 51 is adapted to be easily wrapped about the splice since it is hinged in both directions by virtue of the score lines. For example in a preferred embodiment the score lines are arranged to provide a hinge of about 5 cm. in one direction and about 1.3 cm. in another direction.

As is apparent from FIG. 8, a top of the bag 31 remains open after being enclosed by the cover 51. The arrangement of the liner 41 and the cover 51 with the bag 31 interposed therebetween provides a mold for a waterproofing material, such as a well known D-encapsulant, which is in liquid form and which is capable of being poured into the open top of the bag.

The waterproofing material is a room temperature curing, reenterable, oil-extended polyurethane which is comprised of two parts that are mixed to form a solid, pliable encapsulating composition that gels in about 30 minutes at a temperature of about 73° F. In a preferred embodiment, the urethane is based on a polybutadiene glycol and comprises about seventeen parts by weight of a prepolymer such as for example EV715 and about 83 parts by weight of a polyol such as for example EP934, both being marketed by NL Industries of Hightstown, N.J.

After flowing the waterproofing material into the formed bag, but before it gels, the enclosure 30 can be moved into a confined area and reconfigured from its generally circular cross-section to a cross-section of the confined area. This feature facilitates the rehabilitation of existing splices in a variety of existing outside housings.

The waterproofing material is characterized as a reenterable material in that it is relatively soft and may be removed upon the application of cutting forces, for example; however while intact it provides a water impermeable medium about the splice. This last-mentioned characteristic of the waterproofing material renders the enclosure 30 reenterable at a later time to permit the addition or the deletion of service connections.

As will be recalled, the encapsulant advantageously flows through the openings 42—42 in the liner 41 to create a mechanical bond between it and the liner. Also, because the plastic material which comprises the liner 41 is processed without the use of usual tooling lubricants, the waterproofing material tends to bond to the inwardly and outwardly facing major surfaces of the liner. Otherwise a void or leak path would form between the waterproofing material and the liner except in the vicinity of the flow-through openings 42—42 and this gap would permit the ingress of moisture. Advantageously, this technique for encapsulating the splice minimizes any air pockets which occur when using those hereinbefore-mentioned techniques of inserting ends of cables into prefilled vials of encapsulants.

The top of the bag 31 is folded over and taped and then pushed into the enclosure formed by the cover 51 (see FIG. 9). A cap 61 may be used to cover the top of the enclosure with depending portions of the cap being secured to the outside of the outer liner 51 with wraps of a sealing tape.

FIG. 10 is a cross sectional view of the splice showing end views of the conductors 23—23 and jacketed cables which are enclosed in a liner with the plastic bag 31 pulled thereabout. The cover 51 which is secured in place with the clamps 53—53 holds the assembly to provide a somewhat regularly shaped but not necessarily circular mold for the encapsulant.

In order to provide additional mechanical protection for the splice, a U-shaped guard 71 (see FIG. 11) which is made of a metallic or relatively rigid plastic material is provided. Following the rehabilitation of the splice, the craftsperson moves a length or lengths of U-shaped guard over the splice and into engagement with the telephone pole 20 and secures it to the pole. This guard provides mechanical protection for the splice from damage by collision of moving vehicles or vandalism at least for a suitable distance above ground level. Advantageously, the enclosure 30 is easily confined between the guard 71 and the telephone pole after the waterproofing material has been flowed into the bag but before it gels.

In an alternative embodiment, an enclosure is designed to protect a cable drop that extends downwardly from an aerial run and that is spliced to a cable stub which extends upwardly from the ground. A length of the tubing 31 is moved over the cable or cables which extend above the ground and sealing tape is used to form a collar about the jacket of each of the upwardly extending cables. The craftsperson then splices or resplices associated ones of the conductors of the upwardly and downwardly extending cables with connectors such as those hereinbefore identified. In situations where more than one cable extends upwardly from the ground, the craftsperson installs a spacer block 36 between the collars 33—33 formed thereon. Then a portion of the tubing 31 is secured to the collar or collars 33—33 to form a bag and a length of the perforated liner 41 is wrapped about the conductors. As before, the liner 41 extends a distance over the jacketed portions of the cables.

Then the collapsed tubing 31 is extended upwardly until it covers the liner 41 and encapsulant material is poured into its upper end. Unlike the situation in which only underground cables are spliced, the top end portion of the bag is closed upon the jacket of the aerial cable drop and secured thereto with sealing tape. The tubing 31 is enclosed with a length of the cover 51 and the entire system is covered with a protective U-guard as before.

While the last-described embodiment is suitable for use when the splice of an aerial drop to an underground riser is to be redone, there may be times when only particular ones of the spliced conductors must be reworked. In those instances, the last-described procedure is not adaptable since it would be impossible to install the tubing as described. To rehabilitate such splices, a craftsperson must wrap the liner 41 as before and enclose it with a length of plastic material 91 from which the tubing is made (see FIG. 12).

Prior to the wrapping of a plastic material 91 about the liner, a strip 92 of plastic material which is adhesively coated on each of its major surfaces is engaged with one of the longitudinal edge portions of the inwardly facing surfaces of the strip. Then, the other longitudinal edge portion is adhered to the strip 92 and the laminated edge portions are rolled over in successive turns (see FIG. 13). The plastic material may be secured in place with sealing tape after which the outside cover 51 is wrapped thereabout. Subsequently, the waterproofing material is flowed into the plastic material to encapsulate the splice and the rehabilitation is completed with steps used in the prior-described methods of this invention.

While the enclosure 30 of this invention has been described as one for rehabilitating a cable splice, it is within the scope of this invention for it to be used to protect a terminal block (not shown) to which a cable is connected as well as to protect other kinds of outside telephone plant.

It is to be understood that the above-described arrangements are simply illustrative of the invention. Other arrangements may be devised by those skilled in the art which will embody the principles of the invention and fall within the spirit and scope thereof.

What is claimed is:

1. An enclosed cable splice comprising:
   a liner which is made of a plastic material and which is wrapped about adjacent end portions of a plurality of cables, said cables each comprising a plurality of insulated conductors and a jacket that encloses the conductors, said conductors of one of said cables being spliced to conductors of another cable;
   a length of tubing which is made of a relatively supple plastic material and which encloses said liner and the end portions of the cables, said tubing having at least one end wrapped into secured engagement with at least one of the jackets of the cables;
   a waterproofing material disposed within said tubing between said tubing and said liner and between said liner and the cables to encapsulate the adjacent end portions of the cables; and
   a cover which is made of a plastic material and which surrounds said tubing to form an open ended cylindrical closure, said cover being capable of maintaining the integrity of the tubing and of providing a mold for said tubing and said waterproofing material which is disposed within said tubing.

2. The enclosed cable splice of claim 1, wherein said liner includes a plurality of openings, said waterproofing material being disposed adjacent both major surfaces of said liner and connected through said openings to form a mechanical bond with said liner.

3. The enclosed cable splice of claim 2, wherein said waterproofing material is in substantial engagement with said major surfaces of said liner to prevent the ingress of moisture.

4. The enclosed cable splice of claim 1, which also includes a collar that is formed about the end portion of each of the cables, and means interposed between the cables for maintaining the adjacent ends of the cables spaced apart.

5. The enclosed cable splice of claim 4, which also includes an outer collar which is formed about said individual cable collars about said spacing means.

6. The enclosed cable splice of claim 5, wherein each of said collars is formed by a plurality of wraps of an adhesively backed tape.

7. The enclosed cable splice of claim 5, wherein a lower end of said tubing is secured to said outer collar to form a bag.

8. The enclosed cable splice of claim 7, wherein said waterproofing material is capable of being flowed into an open end of said bag.

9. The enclosed cable splice of claim 8, wherein said waterproofing material is a reenterable polyurethane material, said waterproofing material being one which gels at a temperature of about 73° F.

10. The enclosed cable splice of claim 9, wherein said waterproofing material is one that gels within a time span of about 30 minutes, said polyurethane comprising about 17 parts by weight of a prepolymer and about 83 parts by weight of polyol.

11. The enclosed cable splice of claim 10, wherein said waterproofing material is such that subsequent to its being flowed into said bag but prior to its being gelled, the transverse cross-section of said cover is capable of being reconfigured.

12. The enclosed cable splice of claim 7, wherein an upper end portion of said tubing is folded over within said cover to cover said waterproofing material.

13. The enclosed cable splice of claim 7, wherein another end portion of said tubing is secured to a cable which extends downwardly from an aerial run and which is spliced to an upwardly extending cable.

14. The enclosed cable splice of claim 1, wherein the cables extend adjacent a telephone pole, and including a generally U-shaped guard which is attached to an outer surface of the telephone pole and captivates the enclosed cable splice between the guard and the pole.

15. A method of rehabilitating a cable splice, said method including the steps of:
   moving a length of plastic tubing over an end portion of at least one cable with the tubing being collapsed over a jacketed portion of the cable;
   wrapping a length of a perforated liner about the at least one cable and at least another cable to which said at least one cable is spliced, the width of said liner being sufficient to cover said portions of said cables having insulated conductors thereof exposed;
   extending said tubing about said length of liner to enclose the liner with an open end of said tubing being positioned beyond the spliced conductors;
   wrapping a length of a cover about the tubing, said cover having a width which is sufficient to enclose said tubing;
   flowing a waterproofing material into said tubing and through the perforations of said liner to mechanically bond said waterproofing material to said liner; and
   closing the open end of said tubing.

16. The method of claim 15, wherein two cables extend upwardly to a splice location, and said method further includes forming a collar about each of the cables at adjacent locations, spacing apart said collars, and securing a lower end of said tubing to said collars to form a bag.

17. The method of claim 15, wherein at least one cable extends upwardly to a splice location and another cable extends downwardly to said splice location, said method including the step of securing one end of said tubing to the jacket of said upwardly extending cable and subsequent to the filling of said bag, the step of securing the upper end of the tubing to the jacket of the downwardly extending cable.

18. The method of claim 15, which includes the further step of enclosing said cover with an impact resistant guard.

19. The method of claim 18, wherein said cable splice extends along a portion of a column and said guard encloses said splice and is attached to said column.

20. The method of claim 15, wherein each said step of wrapping said liner and said cover about the splice includes the wrapping of a plurality of lengths with end portions of adjacent lengths being overlapped.

21. A kit having component parts which are capable of being assembled to provide a waterproof enclosure for a cable splice in which a plurality of insulated conductors of one cable are spliced to associated ones of a plurality of conductors of another cable, said kit comprising:
   a length of plastic tubing which is adapted to have one end moved over end portions of the cables and to be collapsed about an at least one cable jacket beyond the insulated conductors of the cable which are exposed for splicing;
   a length of a first plastic material, said first plastic material being corrugated transversely of a longitudinal axis of a supply of the plastic material, said first plastic material capable of being wrapped about the spliced insulated conductors, said first plastic material having a width which is sufficient to enclose said exposed insulated conductors; and
   a length of a second plastic material having a grid of score lines spaced therealong, said score lines extending transverse of and parallel to a longitudinal axis of a supply of the second plastic, said length of second plastic material capable of being wrapped about said tubing after said tubing has been pulled over said length of first plastic material.

22. The kit of claim 21, which also includes means for forming a collar about the jacket of each cable which extends upwardly to the splice location.

23. The kit of claim 22, which also includes a shaped block which is capable of being positioned between the cables and between the collapsed tubing and the exposed insulated conductors to maintain the cables spaced apart.

24. The kit of claim 21, which also includes means for securing said length of second plastic material about said extended tubing, and a supply of water impermeable, reenterable material which is capable of being flowed into an open end of said tubing after said tubing has been pulled over said length of first plastic material.

* * * * *